3,249,450
COLORING OF REGENERATED CELLULOSE
Charles A. Kumins, Chappaqua, and Jerome Fine, Oceanside, N.Y., assignors to Interchemical Corporation, New York, N.Y., a corporation of Ohio
No Drawing. Filed Sept. 21, 1962, Ser. No. 225,391
1 Claim. (Cl. 106—164)

This invention relates to the coloring of regenerated cellulose especially rayon filaments. More particularly, it relates to viscose spinning using a pigmented viscose dope.

The manufacture of viscose rayon employs cellulose which has been treated with sodium hydroxide and then with carbon disulfide to produce cellulose xanthate. The actual spinning dope or viscose solution is cellulose xanthate dissolved in an aqueous sodium hydroxide solution. The viscose solution is then extruded through spinnerets into an acid spinning bath which is conventionally in aqueous solution of sulfuric acid, sodium sulfate, glucose and, optionally, some zinc sulfate. In this bath, the extruded cellulose xanthate is converted into cellulose or rayon filaments.

While this viscose method gives excellent results in the production of uncolored filaments, the problem of inflation of the filaments has arisen when using this method to produce colored filaments by means of a colored dope or pigmented viscose solution, particularly viscose solutions containing dianisidine blue pigments. This inflation is probably due to gases trapped in the filaments. Without commitment on the theory involved, it is believed that the pigment interferes with the escape of gases which may be present in the viscose. It has been found that when using dianisidine blue pigments, the inflation in the resulting filaments may be from about 6% to higher than 75%. Inflation percentages of pigmented filaments as compared to unpigmented filaments may be defined as follows: the density of the unpigmented filament minus the density of the same pigmented filament divided by the density of the pigmented filament multiplied by 100%. Such inflation is undesirable as it reduces the strength of the filament, makes the filament non-uniform and adversely affects the appearance of yarns and fabrics made from said filaments.

We have now found that inflation may be substantially eliminated by employing a mixture of the pigment and either mono-di-octylacidorthophosphate or sulfuric acid treated castor oil which is also known as Turkey red oil in place of pigment alone as a dispersion in the viscose solution.

In this specification and claim all proportions are by weight unless otherwise stated.

In practicing our invention, we employ pigment in the conventional proportions for pigmenting viscose solutions. However, for each 100 parts of pigment, there is admixed therewith preferably from 5 to 10 parts of sulfuric acid treated castor oil or preferably from 5 to 10 parts of mono-di-octylacidorthophosphate. These materials are preferably mixed with the dianisidine blue pigment prior to the pigment being dispersed in the viscose solution. This mixing may be readily accomplished by standard agitation techniques. In addition, in the case of the sulfuric acid treated castor oil, excellent results have been achieved if in the production of the dianisidine blue pigment, the sulfuric acid treated castor oil is present during the coupling step between the o-dianisidine and the naphthol components.

The dianisidine blue pigment used in this invention has the structure:

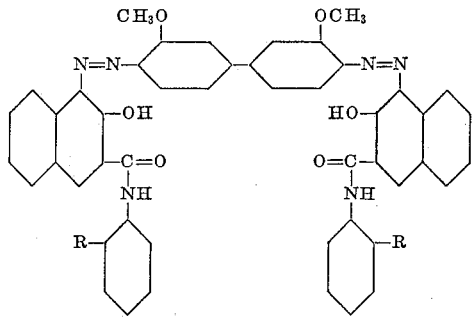

where R is either —OCH$_3$ or CH$_3$. The former structure is No. 21185, Colour Index, 2nd Edition while the latter is made in the same manner as the former except that 2-hydroxy-2-naphtho-o-toluidine is used in place of 3-hydroxy-2-naphtho-o-anisidine.

It will be obvious to those skilled in the art that the techniques set forth in this invention for the production of pigmented rayon with minimal inflation may also be used in the production of pigmented cellophane.

The following examples will illustrate the practice of this invention:

Example 1

2000 g. of dianisidine blue pigment (Colour Index, 2nd Ed., No. 21,185) slurry in water (21.9% solids content) is mixed with 21.9 g. of mono-di-octylacidorthophosphate and 8 additional liters of water and the mixture is stirred for about 3 hours. The slurry is then filtered on a filter press to remove sufficient water to increase the solids content to 20.7%.

0.5 part of the resulting mixture is then dispersed by stirring into 50 parts of a conventional viscose solution which comprises an aqueous solution containing 6–8% cellulose in the form of a xanthate and 6.0 to 7.0% sodium hydroxide. The mixture is then stirred until well dispersed and 50 parts of water are added. The mixture is then deaerated in a vacuum desiccator until no further gassing is noted. This will remove air mixed into the mixture during the dispersion. The mixture is then extruded through a 0.5 mm. bore into an acid bath comprising an aqueous solution of about 10% sulfuric acid, 18% sodium sulfate, and 2.5% zinc sulfate. A filament of colored regenerated cellulose forms. The density of the filament is 1.520.

For comparison purposes the above extrusion procedure is repeated using:

(1) Said viscose solution without said pigment slurry dispersed therein.

(2) Said dispersion of pigment in the viscose but without any mono-di-octylacid-orthophosphate treatment of the pigment.

Without any pigment present, the density of the resulting filament is 1.523, and with pigment present but no treatment with mono-di-octylacidorthophosphate, the density of the resulting filament is 1.405.

The percent inflation of the filaments containing the treated and the untreated pigments is determined as follows:

$$\text{Percent Inflation} = \frac{Du - Dx}{Dx} \times 100\%$$

where $Du$ is density of unpigmented filament and $Dx$ is density of the pigmented filament being tested.

The following are the percent inflation.

| | Inflation, percent |
|---|---|
| Unpigmented filament (control) | 0 |
| Pigmented filament containing the mono-di-octyl-acidorthophosphate treated pigment | 0.2 |
| Pigmented filament containing untreated pigment | 8.4 |

Thus, it can be seen that while inflation in the filament containing the mono-di-octylacidorthophosphate treated pigment is almost negligible, the percent inflation in the filament containing the untreated pigment is 42 times as great.

*Example 2*

95 parts of dianisidine blue pigment (Colour Index No. 21,185) and 5 parts of Turkey red oil, prepared by treating castor oil with 30% sulfuric acid to sulfonate the castor oil, the oil content of said sulfonated castor oil being 64 parts to 4.25 parts of sulfonate groups, are slurried in 540 parts of water by mixing.

Following the procedure set forth in Example 1, 0.5 part of said mixture is then dispersed in 50 parts of the viscose solution described in Example 1, after which 50 parts of water are added and the procedure of Example 1 following to extrude a colored filament having a percent inflation of 1.5%.

*Example 3*

Example 1 is repeated using the same procedure, ingredients and proportions except that instead of the dianisidine blue pigment Colour Index No. 21,185, there is used a dianisidine blue pigment having the structural formula

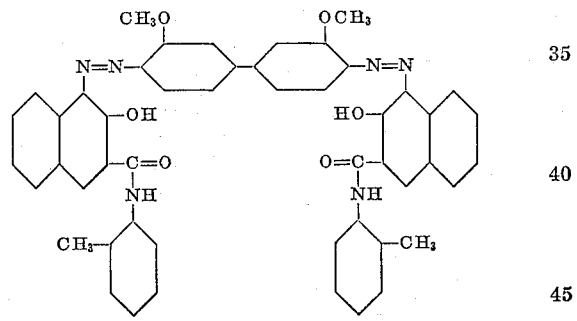

This is made by the same procedure as Colour Index No. 21,185 except that the coupling components are o-dianisidine and 3-hydroxy-2-naphtho-o-toluidide instead of o-dianisidine and 3-hydroxy-2-naphtho-o-anisidide.

The resulting filament displayed the same minimal inflation as the filament produced in accordance with Example 1.

*Example 4*

A composition containing dianisidine blue pigment and sulfonated castor oil is prepared by mixing 23 g. of o-dianisidine with 210 g. of water and 56 g. of hydrochloric acid. Then while maintaining the mixture at 0° to 5° C., add gradually while stirring 13.7 g. of sodium nitrite in 36 g. of water. Continue stirring for about an hour. Add 28.3 g. of 80% acetic acid. The product represents the tetrazo component.

To said product maintained at 0° to 5° C., add a solution having a temperature of 80° C. and comprising 525 g. of water, 19.8 g. of NaOH, 49.8 g. of 3-hydroxy-2-naphtho-o-toluidide and 4.66 gm. of sulfonated castor oil over a period of 20 minutes. Stir for 2 hours while maintaining the temperature of the mixture at about 25° C. and the pH of the mixture at about 7. Heat to 75° C. and filter to remove water. Wash with water until acid free to blue litmus. Sufficient water is then removed to increase the solids content of the resulting slurry to 20%.

Following the procedure set forth in Example 1, 0.5 part of said mixture is then dispersed in 50 parts of the viscose solution described in Example 1, after which 50 parts of water are added and the procedure of Example 1 followed to extrude a colored filament having a percent inflation of 0.26%.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

A composition for extrusion in the manufacture of regenerated cellulose comprising a mixture consisting essentially of
(A) mono-di-octylacidorthophosphate and
(B) dianisidine blue pigment having the structural formula

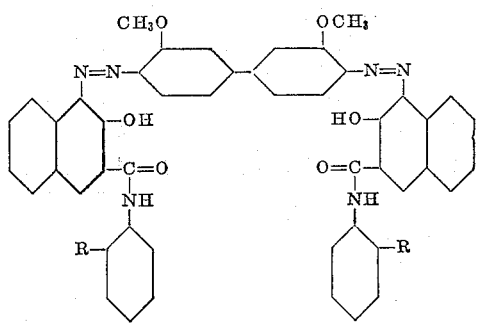

wherein R is a member selected from the group consisting of —CH₃, and —OCH₃ dispersed in a viscose solution.

References Cited by the Examiner

UNITED STATES PATENTS

| 2,005,619 | 6/1935 | Graves | 252—890 |
| 2,307,760 | 1/1943 | Creadick | 106—164 |
| 2,650,168 | 8/1953 | Van Dijk et al. | 106—165 |
| 2,690,398 | 9/1954 | Guertler et al. | 106—165 |
| 3,132,035 | 5/1964 | Reich | 106—165 |

FOREIGN PATENTS

| 340,564 | 1/1931 | Great Britain. |

OTHER REFERENCES

Colour Index, Second Edition, vol. 3, page 3140, 1956 (copy in Group 120).

MORRIS LIEBMAN, *Primary Examiner.*

A. LIEBERMAN, *Assistant Examiner.*